Nov. 30, 1965  G. W. HUFFMAN  3,221,031
STORAGE-STABLE ESTER-QUALITY TETRAHYDROFURFURYL ALCOHOL AND
PROCESS FOR PRODUCING THE SAME
Filed April 9, 1963
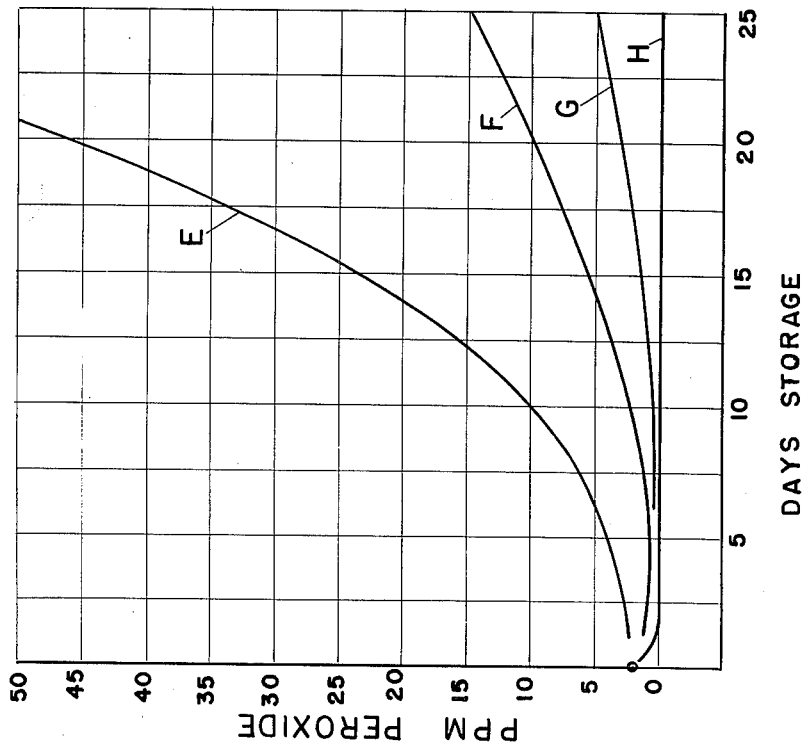
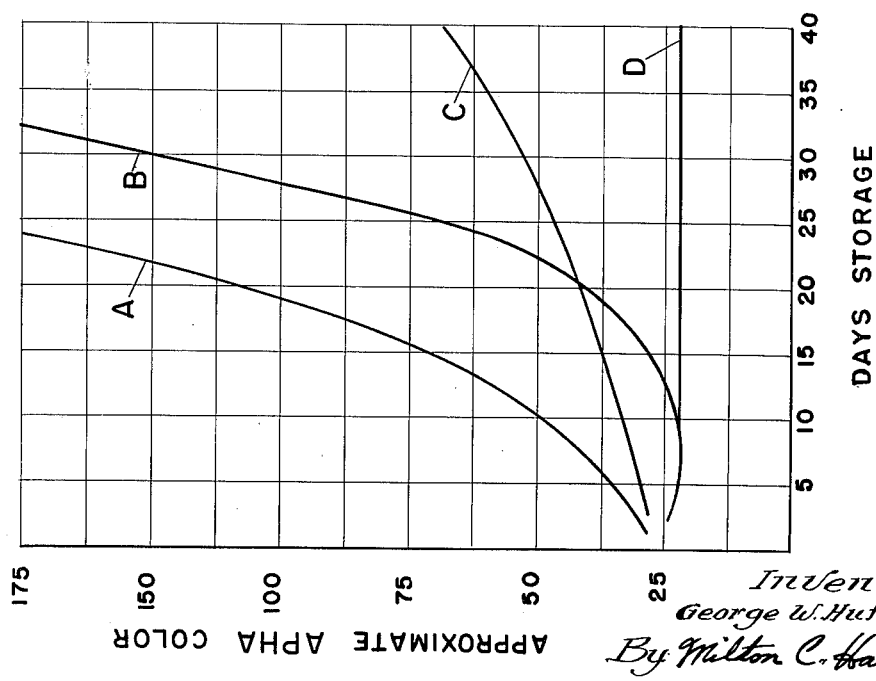
Inventor
George W. Huffman
By Milton C. Hansen
Attorney

United States Patent Office 3,221,031
Patented Nov. 30, 1965

3,221,031
STORAGE-STABLE ESTER-QUALITY TETRAHYDROFURFURYL ALCOHOL AND PROCESS FOR PRODUCING THE SAME
George W. Huffman, Crystal Lake, Ill., assignor to The Quaker Oats Company, Chicago, Ill., a corporation of New Jersey
Filed Apr. 9, 1963, Ser. No. 271,714
12 Claims. (Cl. 260—347.8)

This invention relates to an improved tetrahydrofurfuryl alcohol composition suitable for the production of esters and adducts that are of low color or substantially colorless and to a process for preparing said composition. More specifically, said process is a process for prolonging the storage life of ester-quality tetrahydrofurfuryl alcohol.

The term "ester-quality tetrahydrofurfuryl alcohol," as used herein, is defined as tetrahydrofurfuryl alcohol from which low-color esters may be produced directly. Tetrahydrofurfuryl alcohol which is freshly distilled from caustic (aqueous NaOH solution) is one example of ester-quality tetrahydrofurfuryl alcohol. The term "low color," as used herein, is defined as APHA 100 or less.

Tetrahydrofurfuryl alcohol esters are of considerable utility in commerce and industry as plasticizers for such materials as polyvinyl chloride resins. Tetrahydrofurfuryl alcohol esters (1) have excellent solvency for many of these resins as compared to many standard plasticizers, (2) have low volatility and low fuming at processing temperatures, and (3) impart outstanding resistance to staining of homogeneous vinyl flooring.

Examples of tetrahydrofurfuryl alcohol esters of the plasticizer class are ditetrahydrofurfuryl phthalate, tetrahydrofurfuryl tetrahydrofurfurylethoxy phthalate, di-tetrahydrofurfurylethoxy phthalate, butyl tetrahydrofurfuryl phthalate, hexyl tetrahydrofurfuryl phthalate, octyl tetrahydrofurfuryl phthalate, decyl tetrahydrofurfuryl phthalate, tetrahydrofurfuryl epoxystearate, tetrahydrofurfuryl rosin tallate, tetrahydrofurfuryl tallate and oleate, and mono- and ditetrahydrofurfuryl sebacate.

Examples of adducts of tetrahydrofurfuryl alcohol are the tetrahydrofurfuryl alcohol-ethylene oxide adducts disclosed in U.S. Patent No. 2,744,874. These adducts are useful in surfactant technology.

However, the usefulness of the aforementioned esters and adducts is largely dependent on their being of low color or substantially colorless.

It is known in the art that low-color tetrahydrofurfuryl alcohol esters cannot be prepared with strong acid catalysts, since they lead to decomposition of the tetrahydrofurfuryl alcohol. Mildly acidic materials such as phosphorous acid may produce low-color esters at low conversion levels, but are undesirable for continuing to a high degree of conversion, because of color formation.

Low-color tetrahydrofurfuryl alcohol esters may be producer with alkaline catalysts, using reasonable care, from alcohol freshly distilled from caustic. However, upon storage color-forming precursors develop in tetrahydrofurfuryl alcohol so that badly colored esters are produced by even the best procedures unless the alcohol is purified, e.g. by redistillation from caustic. Freshly distilled tetrahydrofurfuryl alcohol will itself develop color upon storage, and successful tetrahydrofurfuryl alcohol color stabilizers have been found (see U.S. Patent No. 2,904,559). However, esters produced from the color-stabilized tetrahydrofurfuryl alcohol were sometimes of unusable quality because of the dark color of the ester produced. Hence the color-stabilized tetrahydrofurfuryl alcohol also had to be repurified immediately prior to its use for esterification purpose. One of the factors affecting the color of the ester is the level of oxidation products in the tetrahydrofurfuryl alcohol used. To produce esters of satisfactory color, less than 25 p.p.m. carbonyl or 4 p.p.m. peroxide in the alcohol appears to be necessary. However, many tetrahydrofurfuryl alcohol compositions containing known antioxidants were found to produce esters of unsatisfactory color, though the alcohol's level of oxidation products such as carbonyl groups and peroxides had been reduced or stabilized in these compositions.

It was found that many of these materials which lead to unsatisfactory colors in the ester product were indeed good peroxidation stabilizers for tetrahydrofurfuryl alcohol, as measured by low carbonyl and peroxide level in the tetrahydrofurfuryl alcohol. Other materials, such as the alkali metal borohydrides, are valuable for reducing the carbonyl and/or peroxide level of tetrahydrofurfuryl alcohol and were found to permit production of low-color esters if the esters were produced within short storage periods. However, these materials are shown herein to provide an unsatisfactory stabilizing effect for prolonged periods of time.

Hence, one of the objects of this invention is to provide a process for prolonging the storage life of ester-quality tetrahydrofurfuryl alcohol.

Another object of this invention is to provide a tetrahydrofurfuryl alcohol composition from which low-color or substantially colorless esters may be produced, even after prolonged storage of the tetrahydrofurfuryl alcohol, without repurification of said alcohol.

Another object of this invention is to provide an improved tetrahydrofurfuryl alcohol composition which can be stored, shipped, and, without repurification, be used by plasticizer manufacturers for the production of low-color esters, epoxy adducts, and the like.

These and other objects which will become apparent hereinafter are accomplished in accordance with this invention by incorporating in ester-quality tetrahydrofurfuryl alcohol a phosphite ester having the general formula

in which $R_1$, $R_2$ and $R_3$ are the same or different radicals and are selected from the group consisting of a phenyl radical and an alkyl-substituted phenyl radical, the alkyl substituent having from one to ten carbon atoms, said ester being in an amount of at least 0.005% by weight based on the weight of said alcohol. The preferred levels of phosphite ester are between about 0.01% and about 0.10% by weight based on the weight of the alcohol. The use of mixtures of the above phosphite esters is equivalent to the sole use of one of the above phosphite esters.

Two preferred phosphite esters are triphenylphosphite and tri(nonylated phenyl)phosphites. A mixture of tri(nonylated phenyl)phosphites which is available commercially under the trademark "Polygard" is satisfactory for use in accordance with this invention.

A preferred embodiment of this invention is a stable tetrahydrofurfuryl alcohol composition comprising said alcohol having incorporated therein an alkali metal borohydride in an amount of at least 0.001% by weight based on the weight of the alcohol, and one of the aforementioned phosphite esters in an amount of at least 0.005% by weight based on the weight of the alcohol. Preferred levels of the alkali metal borohydrides are between about 0.002% and 0.02% by weight based on the weight of the alcohol. Preferred borohydrides are the sodium and potassium borohydrides.

The invention is further illustrated but is not limited by the following examples in which all percentage values refer to percent by weight based on the weight of the alcohol. All esterification procedures were carried out as outlined in Example 1, below.

In all the examples, "storage time" indicates the number of days of standard accelerated storage of tetrahydrofurfuryl alcohol since it was distilled from caustic. Under the "standard accelerated storage" conditions, tetrahydrofurfuryl alcohol samples were stored in open-top glass containers in a dark cabinet at ambient room temperature conditions with no agitation. The containers were only partially filled, and contained a six-inch depth of the alcohol or alcohol composition. Carbonyl determinations were run by a colorimetric method involving reaction of carbonyl with a 2,4-dinitrophenyl hydrazine in methanol solvent. A suitable method is outlined by G. R. Lappin and L. C. Clark in Analytical Chemistry, vol. 23, p. 541 (1951). Peroxide determinations were run by the method of Kokatur and Jelling as given in Siggia, "Quantitative Organic Analysis via Functional Groups," John Wiley and Sons, p. 100, with the modification that a large quantity (e.g. 75–100 grams) of tetrahydrofurfuryl alcohol sample is used, the solvent alcohol is omitted, and the "incipient heating" step in replaced by heating to 100° C. In all the examples, analysis results for both carbonyl and peroxide are expressed in parts per million by weight based on the weight of the tetrahydrofurfuryl alcohol.

EXAMPLE 1

The effect of a number of tetrahydrofurfuryl alcohol antioxidants on color of tetrahydrofurfuryl alcohol esters produced therefrom is shown in this example. Nine tetrahydrofurfuryl alcohol compositions were prepared by admixing various antioxidant stabilizers with tetrahydrofurfuryl alcohol freshly distilled from caustic. Samples of the tetrahydrofurfuryl alcohol compositions were stored for a period of time under standard accelerated conditions and were then used to prepare ditetrahydrofurfuryl phthalate ester according to the following esterification procedure:

Tetrahydrofurfuryl alcohol (5 moles) and phthalic anhydride (2 moles) are charged to a flask fitted with stirrer, gas inlet tube, thermometer, steam-jacketed condenser, a Bidwell trap above the steam condenser to facilitate measurement of water being removed, and a water-cooled condenser above the Bidwell trap. After the system has been swept out with nitrogen gas, and the temperature raised to 100° C., the catalyst is added. The catalyst is prepared as follows: Sodium aluminate (e.g. 0.0252 mole) is dissolved in 10 ml. water and sodium hydroxide solution is added. For 0.0252 mole of sodium aluminate, 1.5 mls. of sodium hydroxide solution having 0.5 gram/milliliter concentration has been found eminently satisfactory. Heating is continued to permit slow reflux from the steam-jacketed condenser, but additional tetrahydrofurfuryl alcohol is added as needed to maintain reflux temperature below 205° C. No water comes off while the half-ester is formed, and four hours after water begins to come off, the conversion of half ester to full ester was 97% or higher using the procedure of this example. To terminate the reaction, the temperature is dropped to 100° C. and tetrahydrofurfuryl alcohol is distilled off in vacuo, to a pot temperature of 150° C. at 10 mm. Hg pressure. The contents are again cooled to 100° C. and 30% hydrogen peroxide (6 ml.) are added and temperature held at 100° C. for 30 minutes. The contents are washed once with sodium hydroxide solution (400 ml. of 5% w./v. solution) and twice with water. All washings are conducted in such a manner that both ester and water phases are about 90° C. when mixed, in order to facilitate separation of phases. Residual water is stripped off at reduced pressure (e.g. to pot temperature of 120° C. at 20 mm. Hg pressure). Carbon (6 grams) is added to the dry ester and stirred for 30 minutes at 100° C. and removed by filtration.

Upon filtration, yields of 90–95% of theory based on conversion of alcohol or anhydride were obtained in Example 1. The color of the freshly prepared ester was determined according to the well-known APHA procedure. The results of these tests are summarized in Table I below. Octamine is essentially P,P'-dioctyl diphenylamine. BHA refers to a commercially available butylated hydroxy anisole. Topanol M is essentially N,N'-disec. butyl-p-phenylenediamine. Naugatuck 423 is essentially bis(3-methyl-4-hydroxy-5-tert.butyl benzyl)sulfide, and Topanol A is essentially 2,4-dimethyl-6-tert.butylphenol. Polygard is essentially a mixture of tri(nonylated phenyl)phosphites.

*Table I.—Effect on a number of stabilizers on color of ditetrahydrofurfuryl phthalate*

| Stabilizer | Level Added, percent | Days Storage [1] | Ester Color, APHA [2] |
|---|---|---|---|
| None | | <1 | 35. |
| Octamine | 0.05 | 8 | Deep Purple. |
| Hydroquinone | 0.02 | 9 | 250. |
| BHA | 0.01 | 12 | 150. |
| Topanol M | 0.03 | | Pink Color in THFA. |
| Naugatuck 423 | 0.05 | 19 | 400. |
| Topanol A | 0.03 | 6 | 75. |
| Polygard | 0.05 | 13 | 25. |
| Polygard | 0.05 | 37 | 50. |
| Sodium Borohydride | 0.01 | 9 | 25. |
| Sodium Borohydride | 0.01 | 15 | 100. |
| Sodium Borohydride Plus Polygard | 0.01 0.025 | 8 | 25. |

[1] Days after stabilization and prior to esterification.
[2] Ester color refers to color of freshly prepared ester.

EXAMPLE 2

A large batch of tetrahydrofurfuryl alcohol was distilled from caustic and immediately split into four portions. One portion received no additive and was labeled "A"; a second portion was admixed with 0.005% sodium borohydride and was labeled "B"; the third portion was admixed with 0.06% Polygard and was labeled "C"; the fourth portion was admixed with 0.05% Polygard and 0.003% sodium borohydride and was labeled "D." Samples of the four portions were subjected to standard accelerated storage conditions as defined above, and at certain intervals of time esters were prepared from the stored alcohols according to the procedure outlined in Example 1. The APHA color values of the freshly prepared esters were determined and were plotted against the number of days in which the alcohol composition had been stored under standard accelerated conditions, i.e. the lapse of time between the preparation of the alcohol composition and the preparation of the ester. The resulting curves are presented in FIGURE 1, which represents approximate APHA color of freshly prepared ester versus the days of storage of the alcohol before the ester was prepared. Curves A, B, C, and D represent the color of esters prepared from alcohol portions A, B, C and D, respectively, as labeled above. The color of esters prepared from pure tetrahydrofurfuryl alcohol (A) were of unacceptable color before the alcohol had been stored for three weeks. Alcohol compositions containing only sodium borohydride (B) produced esters of improved color for a short time, but within a month were also producing esters of unacceptable color. The alcohol composition (B) remained substantially colorless, however. Though the alcohol containing triphenylphosphite (C) did not initially produce esters having better colors than those of B, it was found that composition C was better after about three weeks and was still producing low-color esters after six weeks of storage.

The APHA color value of the esters prepared from composition D of Example 2 was essentially the same (i.e. APHA values less than 25) throughout the test series, even to the end of the storage test series (80 days). APHA values less than 25 indicate the esters produced from composition D were substantially colorless. FIGURE 1 also clearly shows the unexpected superiority of the phosphite triester as an additive to prolong the storage life of ester-quality tetrahydrofurfuryl alcohol in regard to the color of the ester produced therefrom.

EXAMPLE 3

This example relates to oxidation stabilization of tetrahydrofurfuryl alcohol. A large batch of freshly distilled tetrahydrofurfuryl alcohol was divided into three portions. The first portion received no additive. To the second portion was admixed 0.06% Polygard. To the third portion was admixed 0.05% Polygard and 0.003% sodium borohydride. Samples of these compositions were stored under standard accelerated conditions, and after specific time intervals the samples were analyzed for carbonyl and peroxide level. The results are summarized in Table II.

*Table II.—Stabilization of THFA with sodium borohydride and Polygard.*

| Days Storage | Carbonyl, p.p.m. | | | Peroxide, p.p.m. | | |
|---|---|---|---|---|---|---|
| | No Additive | 0.06% Polygard | NaBH$_4$ 0.003%, Polygard 0.05% | No Additive | 0.06% Polygard | NaBH$_4$ 0.003%, Polygard 0.05% |
| 0 | 10 | 10 | 10 | 1.2 | 1.2 | 1.2 |
| 5 | 14 | 14 | 7 | 3.4 | .6 | 0.0 |
| 8 | 18 | 14 | 7 | 9.9 | .7 | 0.0 |
| 15 | 25 | 16 | 6 | 22 | 1.8 | 0.0 |
| 20 | 55 | 18 | 7 | 71 | 1.6 | 0.0 |
| 29 | 103 | 31 | 7 | 141 | 20 | 0.0 |
| 30 | 136 | 36 | 8 | 132 | 24 | 0.0 |

Results obtained from compositions utilizing triphenylphosphite compounds having different alkyl substituents containing from one to ten carbons on the phenyl group are substantially the same as those indicated in Table II. However, it is not essential that there be an alkyl substitutent having from one to ten carbons attached to the phenyl group of the triester, since unsubstituted triphenylphosphite gives equivalent results.

EXAMPLE 4

A large batch of tetrahydrofurfuryl alcohol was distilled from caustic and immediately was divided into three portions. Sodium borohydride (0.005%) was admixed with the first, tri(nonylated phenyl)phosphite (0.025%) and sodium borohydride (0.005%) were added to the second, and triphenylphosphite (0.025%) and sodium borohydride (0.005%) were added to the third. Samples of each portion were stored under standard conditions and analyzed for carbonyl and peroxide at specific time intervals. The results of this series of tests are given in Table III.

*Table III*

| Days Storage | Carbonyl, p.p.m. | | | Peroxide, p.p.m. | | |
|---|---|---|---|---|---|---|
| | NaBH$_4$ 0.005% | Tri(nonylated phenyl) phosphite 0.025%, NaBH$_4$ 0.005% | Triphenylphosphite 0.025%, NaBH$_4$ 0.005% | NaBH$_4$ 0.005% | Tri(nonylated phenyl) phosphite 0.025%, NaBH$_4$ 0.005% | Triphenylphosphite 0.025%, NaBH$_4$ 0.005% |
| 0 | 8.6 | 8.6 | 8.6 | 1.2 | 1.2 | 1.2 |
| 8 | 5.3 | 4.5 | 5.5 | 0.8 | 0.0 | 0.0 |
| 29 | 71 | 6.1 | 6.5 | 22 | 0.0 | 0.0 |
| 50 | 101 | 5.4 | 6.3 | 44 | 0.0 | 0.0 |
| 64 | 185 | 5.6 | 5.6 | 103 | 0.0 | 0.0 |
| 79 | 194 | 5.9 | 6.3 | 134 | 0.0 | 0.0 |

EXAMPLE 5

This example provides graphic comparison of the peroxide levels spontaneously developed during standard accelerated storage in four tetrahydrofurfuryl alcohol samples. Four tetrahydrofurfuryl alcohol samples were prepared, stored and tested according to procedures similar to those of Examples 3 and 4. The results are summarized in FIGURE 2 in which curve E represents peroxide levels in tetrahydrofurfuryl alcohol containing no additive. Curve F represents levels found in the alcohol containing 0.005% sodium borohydride. Curve G shows the levels in alcohol containing 0.06% Polygard. Curve H ran on the 0.00 p.p.m. line throughout the entire period of the test (80 days) and shows that no trace of peroxide was encountered in tetrahydrofurfuryl alcohol containing 0.03% sodium borohydride and 0.05% Polygard.

The phosphite triester additives used in the composition and process of this invention do provide remarkable protection or stabilization of the tetrahydrofurfuryl alcohol compositions against spontaneous formation of oxidation products as represented by carbonyl and peroxide moieties. Moreover, the compositions of this invention represent surprising and remarkable improvement over other oxidation and/or color-stabilized tetrahydrofurfuryl alcohol compositions known to the prior art and over tetrahydrofurfuryl alcohol alone, insofar as the compositions of this invention may be used directly, i.e. without further purification, even after shipping and storage, for the production of low-color, or substantially colorless, esters of tetrahydrofurfuryl alcohol. However, this surprising and not completely understood property is not limited to the formatioin of low-color or substantially colorless esters alone.

Stored tetrahydrofurfuryl alcohol has heretofore enjoyed only limited use in the preparation of adducts derived from tetrahydrofurfuryl alchohol and 1,2 epoxides. Even if oxygen were excluded during their preparation, the high molecular weight adducts of this type have had a dark color which could not be conveniently removed. Distillation of the high molecular weight tetrahydrofurfuryl alcohol adduct is impractical. However, low-color tetrahydrofurfuryl alcohol epoxy adducts have been possible, in cases wherein distillation of the product is practical. Some low-molecular weight adducts of this type may be distilled.

However, low-color and substantially colorless high and low molecular weight tetrahydrofurfuryl alcohol-alkylene oxide adducts are now conveniently obtained without distillation of the adduct, because of this invention. I have discovered that the composition of this invention may be used directly, i.e. without further purification, even after storage, for the production of substantially colorless tetrahydrofurfuryl alcohol-1,2-alkylene oxide adduct bottoms products. This is illustrated in Example 6, below.

EXAMPLE 6

Tri(nonylated phenyl)phosphite (0.06%) was admixed with tetrahydrofurfuryl alcohol which was freshly distilled from caustic. The resulting composition was subjected to about three weeks of standard accelerated storage conditions. A quantity of the stored composition sufficient to provide 1.25 moles of the alcohol was then charged to a reactor fitted with agitator, Dry Ice condenser, and a gas inlet tube. Nitrogen flow was initiated to remove oxygen. Sodium metal (0.29 gram) was added for catalyst. The pot temperature was raised to 130° C. and a continuous ethylene oxide addition was begun at the rate of two moles per hour until 12.5 moles of ethylene oxide had been added. The temperature was maintained at about 160° C. throughout the reaction. (Tetrahydrofurfuryl alcohol B.P.=178° C./760 mm.) The solution was cooled and the catalyst was neutralized with Dry Ice. The resulting adduct product contained the equivalent of 10 moles of ethylene oxide per mole of tetrahydrofurfuryl alcohol, and had an APHA color less than APHA 25. It is noted that this is a "bottoms" product in the sense that no distillation or other purification of the product is necessary.

A similarly distilled tetrahydrofurfuryl alcohol to which 0.003% sodium borohydride and 0.05% triphenylphosphite have been added gives equivalent results when used according to the procedure of Example 6 even when the composition is stored for eighty days before the ethylene oxide adduct is formed. Similarly distilled tetrahydrofurfuryl alcohol stored for three weeks and used, then, in place of the composition of this invention in the procedure of Example 6 will provide a colored product which cannot be decolorized.

Hence, this invention is seen to provide a process for prolonging the storage life of ester-quality tetrahydrofurfuryl alcohol and to provide a tetrahydrofurfuryl alcohol composition from which low-color, or substantially colorless, esters or 1,2-alkylene-oxide adducts may be produced, even after storage, without further purification of the alcohol. The composition so provided is more desirable and valuable insofar as it can be stored, shipped, and, without repurification, be used for the production of low-color or substantially colorless esters, epoxy adducts and the like.

I claim:

1. A process for prolonging the storage life of ester-quality tetrahydrofurfuryl alcohol comprising incorporating a phosphite ester in ester-quality tetrahydrofurfuryl alcohol, said phosphite ester having the general formula

in which $R_1$, $R_2$ and $R_3$ are selected from the group consisting of a phenyl radical and an alkyl-substituted phenyl radical, the alkyl substituent having from one to ten carbon atoms, said phosphite ester being in an amount between 0.005% and 0.1% by weight based on the weight of said alcohol.

2. A process as in claim 1 in which said ester is triphenylphosphite.

3. A process as in claim 1 in which said ester is tri(nonylated phenyl)phosphite.

4. A process as in claim 1 in which said amount is between about 0.01% and about 0.10%.

5. An improved tetrahydrofurfuryl alcohol composition comprising said alcohol having a phosphite ester incorporated therein in an amount between 0.005% and 0.1% by weight based on the weight of said alcohol, said ester having the general formula

in which $R_1$, $R_2$ and $R_3$ are selected from the group consisting of a phenyl radical and an alkyl-substituted phenyl radical, the alkyl substituent having from one to ten carbon atoms.

6. A composition as in claim 5, in which said amount is between about 0.01% and about 0.10%.

7. A composition as in claim 5 in which said ester is triphenylphosphite.

8. A composition as in claim 5 in which said ester is tri(nonylated phenyl)phosphite.

9. An improved tetrahydrofurfuryl alcohol composition comprising said alcohol having incorporated therein an alkali metal borohydride in an amount between 0.001% and 0.02% by weight based on the weight of the alcohol and a phosphite ester in an amount between 0.005% and 0.1% by weight based on the weight of said alcohol, said ester having the general formula

in which $R_1$, $R_2$ and $R_3$ are selected from the group consisting of a phenyl radical and an alkyl-substituted phenyl radical, the alkyl substituent having from one to ten carbon atoms.

10. A composition as in claim 9 in which said alkali metal borohydride is in an amount between about 0.002% and 0.02% by weight based on the weight of said alcohol, and in which said ester is in an amount between about 0.01 and 0.10% by weight based on the weight of said alcohol.

11. A composition as in claim 9 in which said borohydride is sodium borohydride.

12. A composition as in claim 9 in which said borohydride is potassium borohydride.

References Cited by the Examiner

UNITED STATES PATENTS

| | | | |
|---|---|---|---|
| 2,957,023 | 10/1960 | Dimler et al. | 260—632.5 |
| 3,074,967 | 1/1963 | Brillhart | 260—346.1 |
| 3,104,254 | 9/1963 | Reetz | 252—400 |

NICHOLAS S. RIZZO, *Primary Examiner.*